United States Patent [19]

Brooks

[11] 4,146,195
[45] Mar. 27, 1979

[54] DIRECTION CHANGING SECTION OF PNEUMATIC TUBE CONVEYOR

[76] Inventor: Donal R. Brooks, 1503 SE. 40th Ct., Ocala, Fla. 32670

[21] Appl. No.: 890,267

[22] Filed: Mar. 27, 1978

[51] Int. Cl.² .............................................. B65G 51/18
[52] U.S. Cl. ...................................................... 243/38
[58] Field of Search .................. 243/1, 29, 30, 31, 32, 243/33, 34, 35, 38, 39; 302/2 R, 64; 193/32

[56] References Cited

U.S. PATENT DOCUMENTS

| | | | |
|---|---|---|---|
| 411,864 | 10/1889 | Leaycraft | 243/38 |
| 786,991 | 4/1905 | Podlesak | 302/64 X |
| 4,026,606 | 5/1977 | Williams | 243/38 X |

FOREIGN PATENT DOCUMENTS

| | | | |
|---|---|---|---|
| 1259791 | 1/1968 | Fed. Rep. of Germany | 243/38 |
| 1456883 | 12/1968 | Fed. Rep. of Germany | 243/38 |
| 498236 | 3/1976 | U.S.S.R. | 243/38 |

Primary Examiner—Robert B. Reeves
Assistant Examiner—James L. Rowland
Attorney, Agent, or Firm—Melvin R. Stidham

[57] ABSTRACT

A direction changing section of tubing for a pneumatic tube conveyor wherein a carrier with at least one seal ring around it is of a diameter substantially equal to the diameter of the tube. The portion of the section around the curve is of enlarged inner dimension radially of the curve to enable a carrier to move around it along a series of chords and, hence, turn in a tighter arc. A multiplicity of flexible seal members across and along the curved portion extend radially of the curve so as to be engaged by the carrier passing therethrough.

5 Claims, 3 Drawing Figures

U.S. Patent  Mar. 27, 1979  4,146,195
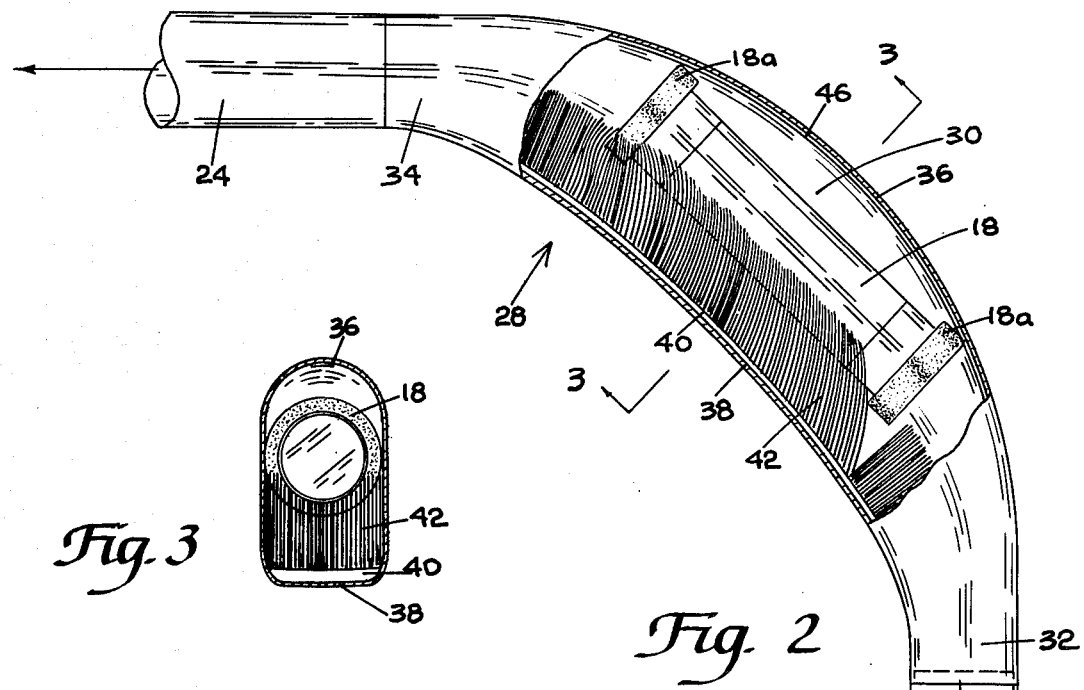
Fig. 3
Fig. 2
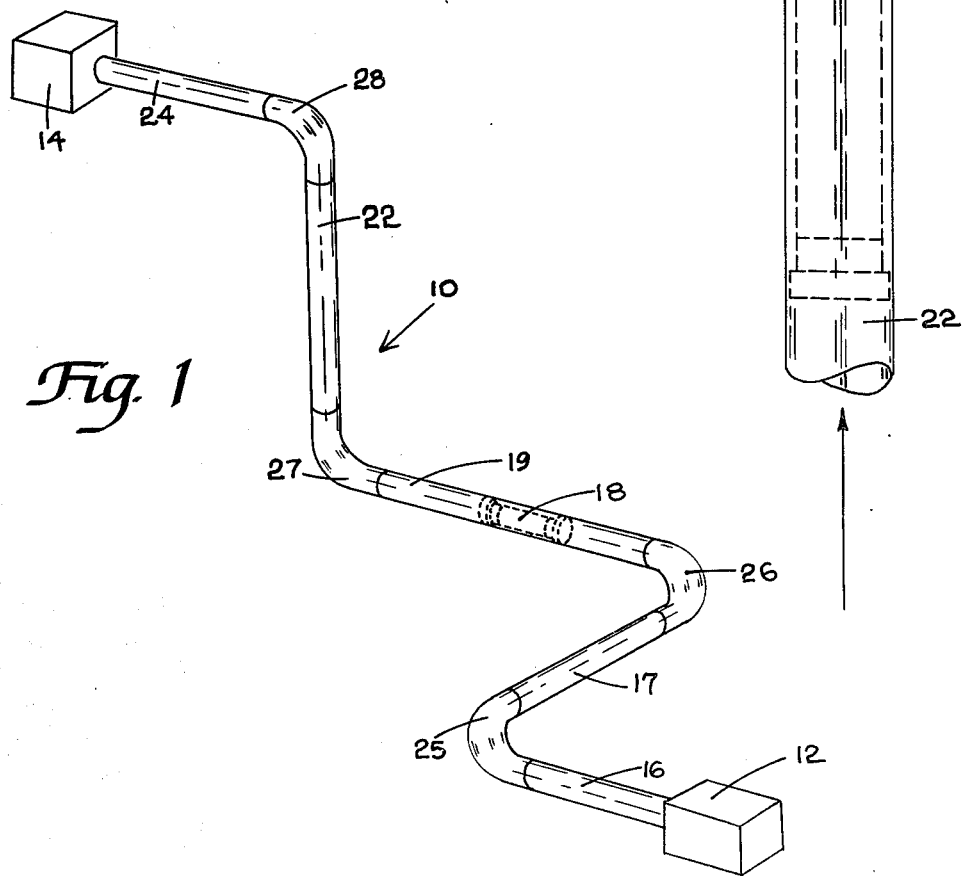
Fig. 1

DIRECTION CHANGING SECTION OF PNEUMATIC TUBE CONVEYOR

BACKGROUND OF THE INVENTION

Pneumatic tube conveyors are in common use in stores, hospitals, office buildings and the like for use in carrying messages, supplies etc. between various points in the building. Such systems operate by generating a pressure differential between two points, either by pressurizing at the sending point or applying a vacuum at the receiving point. The carriers each have at least one seal ring around it so that they function in the nature of a piston to be projected through the tube. Because the carrier fits fairly snugly within the tube changes in direction require bends of extremely large radius which often require that curved section of tubing extend into space which could be utilized otherwise. On certain descending runs, curves of lesser radius are possible by enlarging the cross section of the dimension radially of the curve so that the carrier has more room to turn sharply. In such case, the carrier is projected to the curve by pressure differential and then allowed to fall around the curve by gravity. However, short radius curves of increased cross section have not been possible for upward carrier movements since, when the section of enlarged dimension is reached, pressure differential is lost around the carrier and the propelling force is lost.

OBJECTS OF THE INVENTION

It is an object of this invention to provide a short radius direction changing section of tubing for a pneumatic conveyor.

It is a further object of this invention to provide a direction changing section of tubing for pneumatic conveyor which enables a carrier to be projected upward therearound.

Other objects and advantages of this invention will become apparent from the description to follow, particularly when read in conjunction with the accompanying drawing.

SUMMARY OF THE INVENTION

In carrying out this invention I provide a curved section of tubing for a pneumatic tube conveyor which is circular in cross section at both ends of the curve to conform with that of the inner tubing to which it is connected but which increases in cross sectional dimension radially of the curve to enable the carrier to move around it in a shorter radius. Inside the curve section extending radially outward from the inside of the curve is a multiplicity of flexible seal members which extend across and along the curve to be engaged by the carrier as it passes through impeding the passage of air around it and thereby preventing loss of pressure differential across it.

BRIEF DESCRIPTION OF THE DRAWING

In the drawing:

FIG. 1 is an illustration of a portion of a pneumatic tube conveyor system;

FIG. 2 is a side view partially broken away of a direction changing section of tubing embodying features of this invention; and FIG. 3 is a section view taken along line 3—3 of FIG. 2.

DESCRIPTION OF A PREFERRED EMBODIMENT

Referring now to the drawing with greater particularity, the pneumatic tube conveyor system 10 may include, for example, a station 12 and a station 14. The system 10 includes means for creating a pressure differential between stations 12 and 14, as by introducing compressed air at one station, say at 12, or creating a vacuum at the other. In either case the pressure differential propels a carrier 18 through the tubing runs 16, 17, 19, 22 and 24 from station 12 to station 14. The carrier 18 has at least one seal ring 18a around it, and preferably one at each end which are of a diameter to fit closely within the tubing 17, 19, 22 and 24. Connected between straight runs, are bends or direction changing sections 25, 26, 27 and 28, which embody features of this invention.

As shown clearly in FIG. 2, the transition section 28 has end connector portions 32 and 34 which are circular in cross section and of the same diameter as the vertical and horizontal runs 22 and 24. However, the intermediate, curved portion 36 gradually increases in inner dimension radially of the curve 30 as by carrying the inside wall 38 inward toward the center of curvature. This enables the carrier 14 to move along a series of chords of the curve 30 and, hence, turn in a smaller radius that would be possible if tightly confined in a tube of uniform cross section.

Secured to the inside wall 38 is a base 40, which extends across and along the curve inside wall 38 between the circular connector portions 32 and 34. Extending radially from the base 40, and into the path of movement of the carrier 18 is a multiplicity of seal or baffle members 42, which may take the form of a multiplicity of bristles of Nylon or the like which are extremely flexible, but which have sufficient body to remain upright in the path of the carrier 18. For example, such bristles could be of the type commonly found in paint brushes, such as of Nylon. I have found that with a great multiplicity of such bristles, a fairly effective seal is maintained to prevent loss of pressure differential across the carrier 18. The bristles 42 effectively block flow past the carrier 18 on the inside, and the carrier seals 18a maintain sufficient contact to minimize pressure loss around the outside. Hence, the carrier is propelled around the bend even from a vertical riser 22.

With this invention, the curved section 36 may be of a radius less than twice the length of the carrier 18, as distinguished from a normal radius for bends of uniform cross section of four to six times the carrier's length. For many installations, the section 36 may be made of a suitable plastic, in which case, a wear plate 46 of metal may be bonded or otherwise secured to the inner surface of the outer curve 36.

While this invention has been described in conjunction with a preferred embodiment thereof, it is obvious that modifications and changes therein may be made by those skilled in the art without departing from the spirit and scope of this invention as defined by the claims appended hereto.

What I claim as invention is:

1. For installation in a pneumatic tube conveyor system comprising:
    a lengthy tube extending between at least two sending and receiving stations, and being of a principal inner diameter over most of the length thereof; and hollow carriers having cylindrical end portions, each with a seal ring around it of a diameter substantially equal to the principal inner diameter of said tube to enable propulsion thereof by a gas pressure differential along the length of said tube;

a direction-changing section of tubing comprising;

end portions of substantially said principal inner diameter;

an intermediate portion disposed along an arcuate path;

said intermediate portion being enlarged in inner cross-section dimension in the direction radial of said arcuate path to enable a carrier to move around said intermediate portion with said seal rings engaging the radially outer surface thereof; and a plurality of flexible seal members across said intermediate portion extending outward from the radially inner surface thereof so as to be engagable by, and seal against a carrier passing therethrough.

2. A direction-changing section of tubing defined by claim 1 wherein:

the radius of curvature of said intermediate section is less than twice the length of a carrier.

3. The direction-changing section of tubing defined by claim 1 wherein:

said seal members are very flexible but with enough flexural strength to be self-supporting in vertical disposition.

4. The direction-changing section of tubing defined by claim 1 wherein:

said seal members comprise a multiplicity of bristles extending radially of said arcuate path across and along said intermediate portion.

5. The direction-changing section defined by claim 1 wherein:

said section is of a non-metallic material; and including:

a metal wear plate secure in said section around the outside curve thereof.

* * * * *